United States Patent [19]
Setbacken et al.

[11] Patent Number: 5,981,940
[45] Date of Patent: Nov. 9, 1999

[54] ANGLE MEASURING SYSTEM WITH A CLAMPABLE SHAFT

[75] Inventors: Robert Setbacken; Richard Michael Goeden, both of Santa Barbara, Calif.

[73] Assignee: Renco Encoders, Inc., Goleta, Calif.

[21] Appl. No.: 08/929,539

[22] Filed: Sep. 15, 1997

[51] Int. Cl.⁶ .................................................. G01D 5/34
[52] U.S. Cl. ............................... 250/231.13; 250/231.18
[58] Field of Search ........................ 250/231.13, 231.18, 250/239; 356/375

[56] References Cited

U.S. PATENT DOCUMENTS

| | | | |
|---|---|---|---|
| 4,031,441 | 6/1977 | Garrett | 250/231.13 |
| 4,652,748 | 3/1987 | Siraky et al. | 250/231.13 |

FOREIGN PATENT DOCUMENTS

| | | |
|---|---|---|
| 30 38 005 A1 | 10/1980 | Germany. |
| 89 15 109.7 | 12/1989 | Germany. |

*Primary Examiner*—Que T. Le
*Attorney, Agent, or Firm*—Brinks Hofer Gilson & Lione

[57] ABSTRACT

The angular measuring system has a hollow pick-up shaft whose end is slitted, and the slitted area has an interior thread. A screw with an exterior thread is provided for clamping the pick-up shaft in a bore of a driveshaft. The screw is turned into the pick-up shaft until it is axially supported on a detent. By further turning of the screw the thread flanks of the interior thread and of the exterior thread cause the slit end of the pick-up shaft to be spread open radially.

4 Claims, 2 Drawing Sheets

ANGLE MEASURING SYSTEM WITH A CLAMPABLE SHAFT

FIELD OF THE INVENTION

The present invention relates to an angle measuring system with a coding disk for measuring the angular position of a pick-up shaft having a clamping device for clamping the pick-up shaft, fixed against relative rotation, to a driveshaft of a drive unit. The pick-up shaft has axial slits in the clamping area and can be radially spread open by an actuating element.

BACKGROUND OF THE INVENTION

U.S. Pat. No. 4,652,748 discloses an angle step indicator. It consists of a housing in which a hollow shaft is rotatably seated. A coding disk for measuring the angular position of the shaft with respect to a scanning unit fastened to the housing is fastened on this shaft, fixed against relative rotation. One end of the shaft is slitted and has a conical interior bore on which the conical tip of a pin acts. The pin is axially displaceable by a screw inserted into the other end of the shaft so that the slitted end of the shaft is spread open. The shaft of the angle measuring system is radially clamped by this spreading open of the slitted end of the shaft in either a bore of an element of a shaft coupling or directly in a bore of a motor shaft. In every case the shaft of the angle measuring device is connected with the driveshaft, for example a motor shaft, by a shaft coupling.

A similar angle measuring device is described in German Patent Publication No. DE 30 38 005 A1. In this example the shaft end facing the drive unit is also slitted. This shaft end can be spread open by a wedge. The wedge has an interior thread which works together with the exterior thread of a screw. The head of the screw is supported on the shaft end, so that the screw itself is not axially displaceable. The thread flanks of the screw are displaced in the axial direction by turning the screw, which causes an axial displacement of the wedge and thus radial spreading of the slitted shaft end.

All known measuring systems have the disadvantage that, in addition to the screw, other elements, are still required for spreading.

It is thus desirable to provide an angle measuring system with a clampable shaft with relatively fewer elements then known systems and which is simple to implement.

SUMMARY OF THE INVENTION

According to a first aspect of the present invention there is provided an angle measuring system having a coding disk for measuring the angular position of a pick-up shaft and a clamping device for clamping the pick-up shaft, fixed against relative rotation, to a driveshaft of a drive unit. The pick-up shaft has axial slits in the clamping area which can be radially spread open by an actuating element. The system includes a screw being the actuating element which can be turned in the pick-up shaft and which has an exterior thread in the clamping area, and a corresponding interior thread on the pick-up shaft in the clamping area. The screw has an axially acting detent surface which is supported against an axial detent of the pick-up shaft during clamping.

It is an object of the invention to disclose an angle measuring system which is simply constructed and which makes possible a dependable and simple clamping of the shaft with a driveshaft.

The invention will be explained in more detail with reference to the Figures and detailed description of the presently preferred embodiments.

DETAILED DESCRIPTION OF THE PRESENTLY PREFERRED EMBODIMENTS

Figure 1:
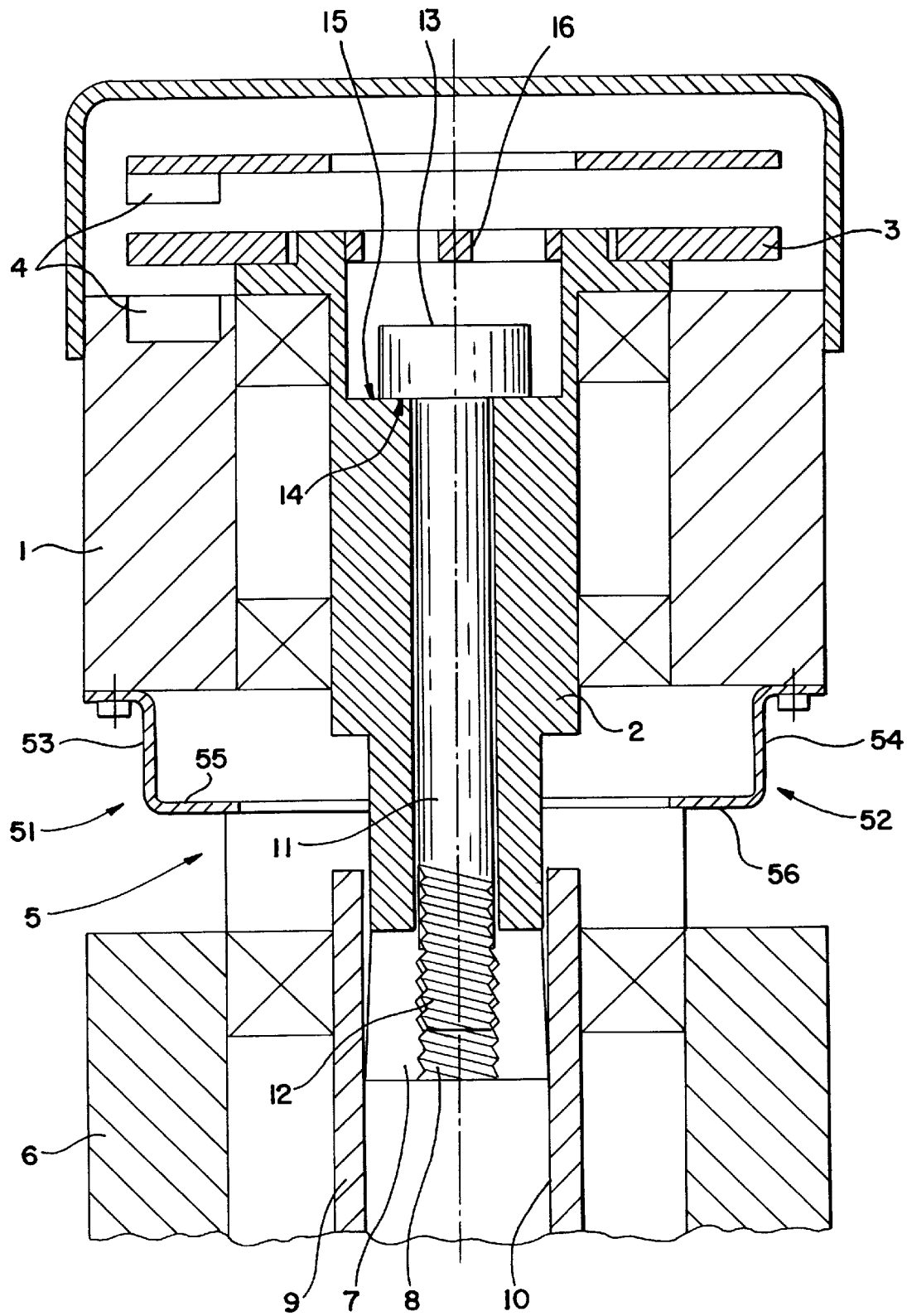
FIG. 1 illustrates a cross-sectional view of an angle measuring system according to a preferred embodiment of the present invention.

The angle measuring system shown in FIG. 1 includes a stator 1, a pick-up shaft 2, a coding disk 3, a scanning unit 4, a coupling 5, and a stationary element 6 of a drive unit, for example, a motor. The pick-up shaft 2 is preferably continuously hollow and is rotatably seated in the stator 1. The coding disk 3 is fastened to a first end of the pick-up shaft 2 by glue, for example. In a preferred embodiment an incremental or absolute coding is placed on the coding disk 3. The coding disk 3 is scanned by the scanning unit 4 which emits position-dependent electrical signals as is well known to those of ordinary skill in the art and thus need not be described in detail herein.

The stator 1 is fastened by coupling 5 to the stationary element 6. The coupling 5 assures a connection, fixed against relative rotation, of the stator 1 and the stationary element 6, but permits compensating movements between these two elements in all directions. The coupling 5 is especially rigid and free of play in the direction of rotation. In a preferred embodiment the coupling 5 consists of a spring sheet metal plate with several leaf spring arms 51 and 52. Each leaf spring arm 51, 52 has axially extending areas 53, 54, which are substantially parallel with the pick-up shaft 2 and radial areas 55, 56 extending perpendicularly to the pick-up shaft 2. The axially extending areas 53, 54 form a spring parallelogram and permit radial compensation movements between the stator 1 and the stationary element 6 which occur, inevitably because of eccentricities between the stator 1 and the stationary element 6. The radially extending areas 55, 56 permit axial compensation movements between the stator 1 and the stationary element 6. Such a coupling has been described, for example, in German Patent Publication No. DE 89 15 109 U1.

The second end of the pick-up shaft 2 which is opposite of the first end on which the coding disk 3 is coupled and which faces the stationary element 6 has axially extending slits 7 and an interior thread 8. If the pick-up shaft 2 is to be connected, fixed against relative rotation, with a driveshaft 9 located in the stationary element 6, the slitted second end of the pick-up shaft 2 is pushed into a bore 10 located in the driveshaft 9 and the slitted area of the pick-up shaft is spread open radially which achieves a rigid radial clamping. A screw 11 is used to spread the slitted area of the pick-up shaft open. More particularly, the screw 11 has an exterior thread 12 on one end and a head 13 on an opposite end. Starting at the first end of the pick-up shaft 2, the screw 11 is turned into the hollow pick-up shaft 2 until the screw's radially extending surface 14 is supported at a shoulder having a radially extending surface 15 of the pick-up shaft 2. The surfaces 14 and 15 form an axially effective detent up to which the screw 11 can be turned into the pick-up shaft 2.

If, after reaching the shoulder of the pick-up shaft 2, the screw 11 is further turned with relation to the pick-up shaft 2, the thread flanks of the exterior threads 12 of the screw 11 and the interior threads 8 of the pick-up shaft 2 cause the slit end of the pick-up shaft 2 to spread open.

If twisting of the coding disk 3 is to be avoided during the clamping operation between the pick-up shaft 2 and the driveshaft 9, means 16 can be provided on the pick-up shaft 2 with which the pick-up shaft 2 is held, fixed again relative rotation, when the screw 11 is turned. These means 16 can be specially shaped recesses on the pick-up shaft 2, which are accessible to a tool. This tool can be hand-held during assembly, but can also be designed such that it automatically causes clamping between the pick-up shaft 2 and the stator 1 during the assembly of the two shafts 2 and 9. For example, a set of pick-up holes for use with a spanner wrench or a set of flats for use with an open-end or box end wrench could be used. Alternatively, it may also be possible to make a wrench that fits like a cap over the top of the encoder to allow the locking of the pick-up shaft 2 as discussed above as well as engaging a similar feature or fixation point on the outside body of the stator 1. Such a configuration would allow the use of automated tooling.

Figure 2:
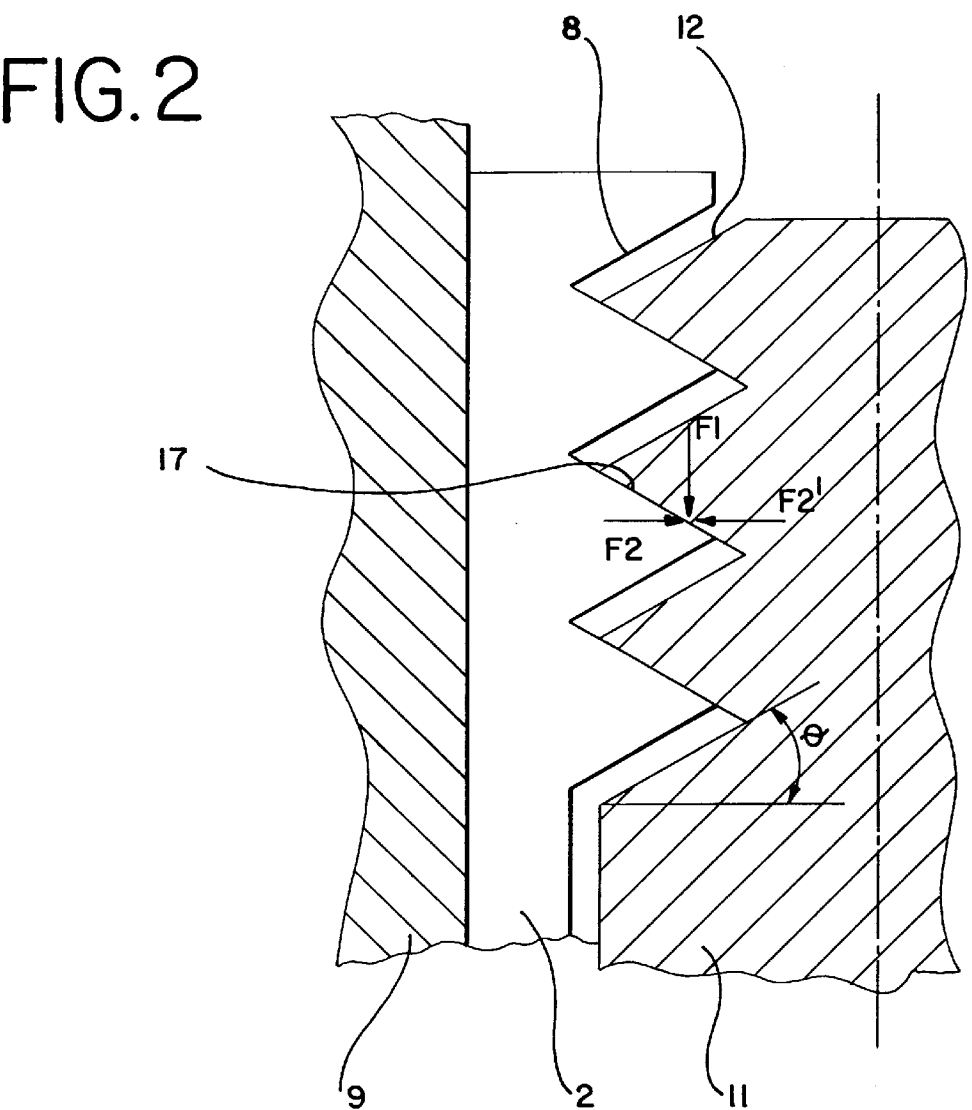
FIG. 2 illustrates an exploded view of a portion of the measuring system shown in FIG. 1 which illustrates the principle of operation of the shaft clamping according to a preferred embodiment of the present invention.

FIG. 2 illustrates an exploded view of a portion of the measuring system shown in FIG. 1 which illustrates the principle operation of the shaft clamping according to a preferred embodiment of the present invention.

If the screw 11 has been turned into the pick-up shaft 2 up to the detent 14, 15, the surface 14 of the screw head 13 is pressed against the surface 15 of the pick-up shaft 2. With further turning of the screw 11 a longitudinal force of tension F1 appears at the thread flanks 12 of the screw 11. (FIG. 2) The thread flanks 12 are inclined at an angle $\theta$, for example 30°, to the force F1, which results in components of this force being developed both normal and parallel to the contact surface 17 defined by the exterior threads 12 of the screw 11 and interior threads 8 of the pick-up shaft 2.

Figure 3:
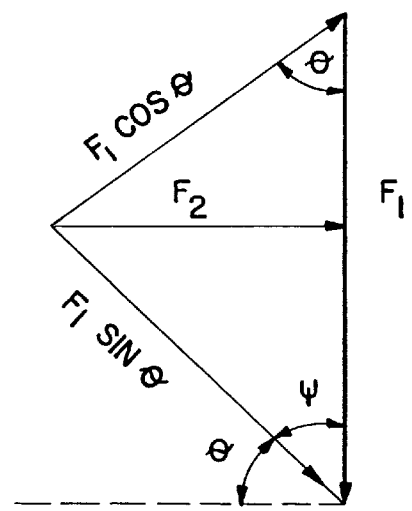
FIG. 3 is a vector representation of the forces shown in FIG. 2.

The force F1 has component F1 sin $\theta$ normal to surface 17, and F1 cos $\theta$ parallel to surface 17. (See FIG. 3). Similarly, the force F1 cos $\theta$ has component F2=F1 cos $\theta$ sin $\theta$ which is at right angles to F1. The force F2 created by the longitudinal force on screw 11 has an equal and opposite force F2' created by the resistance of the pick-up shaft, threads. These two forces attempt to force the slotted portion of the pick-shaft away from the screw but this motion is constrained by the surface of the bore 10 in driveshaft 9.

The surfaces 14 and 15 of the screw 12 and shaft 2, respectively constitute an axially acting detent, up to which the screw 11 can be turned into the pick-up shaft 2. Furthermore, the touching surfaces 14, 15 form relatively large friction surfaces in the clamped state of the pick-up shaft 2, which are located on a relatively large radius, so that a large unscrewing moment is achieved on account of the friction. This has the advantage that the clamping will not automatically loosened during operation.

It is to be understood that the forms of the invention described herewith are to be taken as preferred embodiments and that various charges in the shape, size and arrangement of parts may be resorted to, without departing from the spirit of the invention or the scope of the claims.

What is claimed is:

1. An angle measuring system having a coding disk for measuring the angular position of a pick-up shaft and a clamping device for clamping the pick-up shaft, fixed against relative rotation, to a driveshaft of a drive unit, wherein the pick-up shaft has axial slits in the clamping area which can be radially spread open by an actuating element, the system comprising:

a screw being the actuating element which can be turned in the pick-up shaft and which has an exterior thread in the clamping area; and a corresponding interior thread on the pick-up shaft in the clamping area, wherein the screw has an axially acting detent surface which it is supported against an axial detent of the pick-up shaft during clamping.

2. The angle measuring system according to claim 1 wherein the screw is guided through the pick-up shaft from the end opposite the driveshaft, and the end of the pick-up shaft facing the driveshaft has the slits.

3. The angle measuring system according to claim 1 wherein the pick-up shaft is rotatably seated in a stator of the angle measuring system, and the stator is connected with the stationary element of the drive unit by a coupling in a manner fixed against relative torsion, but radially and axially resilient.

4. The angle measuring system according to claim 3 wherein the coupling is made of spring sheet metal with spring arms extending axially and parallel with each other and constitute a parallel guide which is fixed against relative torsion.

* * * * *